US008193983B1

(12) United States Patent
Farmer

(10) Patent No.: US 8,193,983 B1
(45) Date of Patent: Jun. 5, 2012

(54) AUTOMATED ANTENNA ALIGNMENT SYSTEM

(76) Inventor: Michael K. Farmer, Harvest, AL (US)

( * ) Notice: Subject to any disclaimer, the term of this patent is extended or adjusted under 35 U.S.C. 154(b) by 0 days.

(21) Appl. No.: 12/924,783

(22) Filed: Oct. 5, 2010

(51) Int. Cl.
*H04B 7/00* (2006.01)
(52) U.S. Cl. ........................................................ 342/367
(58) Field of Classification Search .................... 342/367
See application file for complete search history.

(56) References Cited

U.S. PATENT DOCUMENTS

| | | | | |
|---|---|---|---|---|
| 6,027,257 | A * | 2/2000 | Richards et al. | 396/428 |
| 6,559,806 | B1 * | 5/2003 | Watson | 343/766 |
| 6,690,917 | B2 * | 2/2004 | Soliman et al. | 455/12.1 |
| 6,897,828 | B2 | 5/2005 | Boucher | |
| 7,501,993 | B2 | 3/2009 | Boucher | |

OTHER PUBLICATIONS

The American Heritage® Dictionary of the English Language, Fourth Edition © 2000, 2007, definition of "heading".*

* cited by examiner

*Primary Examiner* — Thomas Tarcza
*Assistant Examiner* — Frank J McGue
(74) *Attorney, Agent, or Firm* — Mark Clodfelter

(57) ABSTRACT

A system for automatically aligning two data antennae is disclosed. Each antenna is provided with a pan and tilt unit, a GPS receiver for locating a respective antenna's location, a position reporting radio for broadcasting a local position to the remote antenna, and a magnetic compass including tilt sensors for determining tilt of the antenna and for establishing a reference heading. A computer at each location receives the local coordinates, remote coordinates reference heading and tilt information, and calculates a difference between the reference heading and bearing to the remote antenna. This information is converted to pan and tilt commands to drive the antenna to the bearing of the remote antenna. Two antenna equipped in this manner can be aligned simultaneously.

20 Claims, 6 Drawing Sheets

AUTOMATED ANTENNA ALIGNMENT SYSTEM

FIELD OF THE INVENTION

This invention relates to alignment or boresighting of antennae, and particularly to an automated system wherein antennae are aligned using GPS (Global Positioning System) and compass data to obtain each antenna's local position. The local antenna's position is sent to the other antenna via a radio link, and vice versa. At each antenna, true bearing, true heading and tilt are calculated and used to set pan and tilt of each antenna so the antennae are pointed at each other. Typically, accurate, automatic alignment is achieved within two minutes of GPS lock.

BACKGROUND OF THE INVENTION

Antenna used to transmit microwave data, such as cellular voice communications, streaming video, Internet data and the like, must be aligned, or boresighted, to a relatively high degree of accuracy in order to achieve optimum broadcast reception and transmission. Typically, microwave antennae must be aligned to within about 5 degrees or so. In order to accomplish this alignment, surveyors provide precise ground coordinates and geodesic reference points for a physical location of each antenna. This information in turn is given to a technician, who then uses an iterative process to align the antennae and permanently or semi-permanently fix each antenna in place for best reception and transmission of signals from a distant antenna. In some instances, the technician must travel one or more times between two antennae being aligned, which may be 50-60 miles or further apart, in order to precisely align the antennae. The process is expensive, as surveyors are required to provide the ground coordinates of each antenna, and the technician must not only have some electronics training and experience, but must also be trained to climb towers and the like where the antenna dishes are located.

Known prior art includes U.S. Pat. No. 6,897,828, to Boucher, which uses two GPS satellite dishes spaced apart a known distance along an arm mounted to the antenna to be aligned, the arm extending in a direction of radio waves emitted by the antenna. A hand-held controller allows communication between the two GPS dishes. The controller is configured to calculate an azimuth the arm is pointed toward, which allows a technician to manually rotate the arm with the antenna to be aligned attached thereto, to point toward a predetermined azimuth.

One disadvantage of this system is that the azimuth from one antenna to the next must already be known to a relatively high degree of precision. Also, the technician is still required to manually perform a fine alignment of the antennae. Further, the obtained azimuth from the two GPS dishes depends on the accuracy of the GPS system providing a location of each dish, which can be problematic. As such, the system of Boucher only reliably provides what can be considered a coarse alignment. Further yet, only one antenna at a time can be aligned.

Another patent to Boucher, U.S. Pat. No. 7,501,993, teaches an antenna alignment system wherein one or two reference targets are fixed to an antenna to be pointed along a known azimuth direction. One or two GPS receiver dishes are mounted to reference tools, i.e. a theodolite or the like, with the two receiver dishes used to locate two points, P1 and P2, which are located a known distance apart. The reference positions are also calibrated with respect to a reference azimuth and to each other relative to geometric North. Calculations are then performed to determine an azimuth axis of the antenna, which allows the antenna to be aligned along the azimuth axis.

Problems with this system are that it requires an elaborate setup wherein the positions P1 and P2, which are not on the structure where the antenna to be aligned is located, must be determined. Also, the tower or other structure must be climbed once in order to prepare the antenna for alignment, and climbed one or more times to align the antenna. As with Boucher's first patent, the predetermined azimuth to the next antenna must be relatively precisely known in advance in order to align the two antennas. Also, like Boucher's first patent, only one antenna at a time may be aligned.

According to the following specification, Applicants provide an automated antenna alignment system that can simultaneously align two antennae, the process resulting in highly accurate alignments at ranges of up to 50 miles or more.

DETAILED DESCRIPTION OF THE DRAWINGS

The system of the instant invention allows automated alignment of two stationary antennae. As with most or all microwave data transmission systems using radio waves, the antennae typically must have a direct line-of-sight with each other, with the requirement that the main lobe or beam of radiation from a transmitting antenna be aligned with a high degree of accuracy with a receiving antenna. Typically, such antennae are mounted at high locations, such as on towers, tall buildings, hills, mountaintops or the like in order to maintain the line-of-sight relation between the antennae over the curvature of the earth. As such, distances between two antennae may be 50 miles or more. Required accuracy of alignment is somewhat dependent on the distance the antennae are separated, but at longer distances accuracy of 1-3 degrees is required for antenna having narrower beam envelopes, while antenna such as the Motorola™ antenna described below have a beam-width of around 11 degrees or so.

Figure 1:
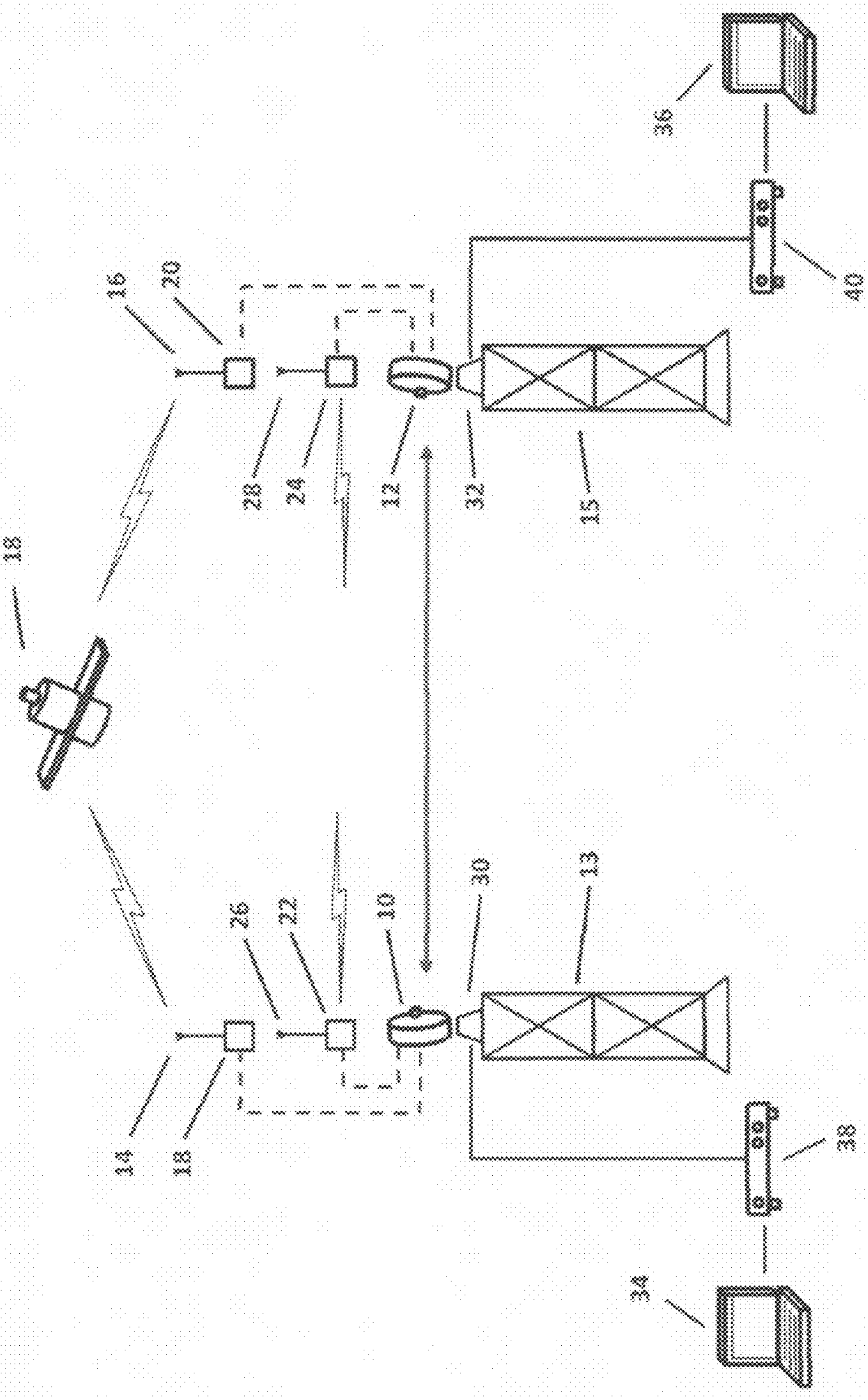
FIG. 1 is an overall system diagram of the present invention.

Referring to FIG. 1, an overview of Applicants system is shown. Two microwave data antennae 10 and 12 that are to be aligned are shown, these antennae mounted on towers 13, 15 or other stable, elevated locations, and spaced apart as far as possible while still maintaining a line of sight between the two antennae. As noted, this distance may be 50 miles or more. At each antenna 10, 12 there is a location finder that precisely locates a position of a respective antenna and provides an electronic indication of such position as at least latitude and longitude coordinates. While GPS location finders are most commonly used, a device that simply stores known coordinates of an antenna tower and is capable of providing such coordinates in a format readable by a computer is considered to be a location finding device within the scope of this application. Also, any other known location finding device that will provide an electronic indication of local location is considered within the scope of this application. As such, GPS antenna 14, 16, respectively, and associated GPS position-finding circuitry 18, 20, respectively, are provided that each communicate with GPS satellites 18 (only 1 shown) in order to precisely determine a local position of each respective data antenna 10, 12. A position reporting radio transmitter/receiver 22, 24 is also located at each antenna 10, 12, respectively, each position reporting radio having an associated antenna 26, 28, respectively. These position reporting radios are typically of the UHF type, for transmitting position data obtained by the local GPS receiver to the remote antenna, although any means of reporting position of a local antenna to a remote receiver of location signals, such as telephone or cellular telephone communications, satellite links or the like are considered within the scope of the instant invention. Here, as cellular telephones have advanced to the point where they incorporate GPS devices and functions, a cellular telephone carried by a technician may be connected to Applicants system, such as through a USB or other serial data link to a computer at each of the antenna to be aligned, and used in place of a permanently located position reporting radio and GPS unit. In this embodiment, each cellular telephone would detect its respective local position, and report its local position via cell phone communications to a cell phone connected to the opposite, remote antenna. Such communications may occur over data channels of the cellular network, these data channels being accessible to around 95% or so of the United States.

Figure 2:
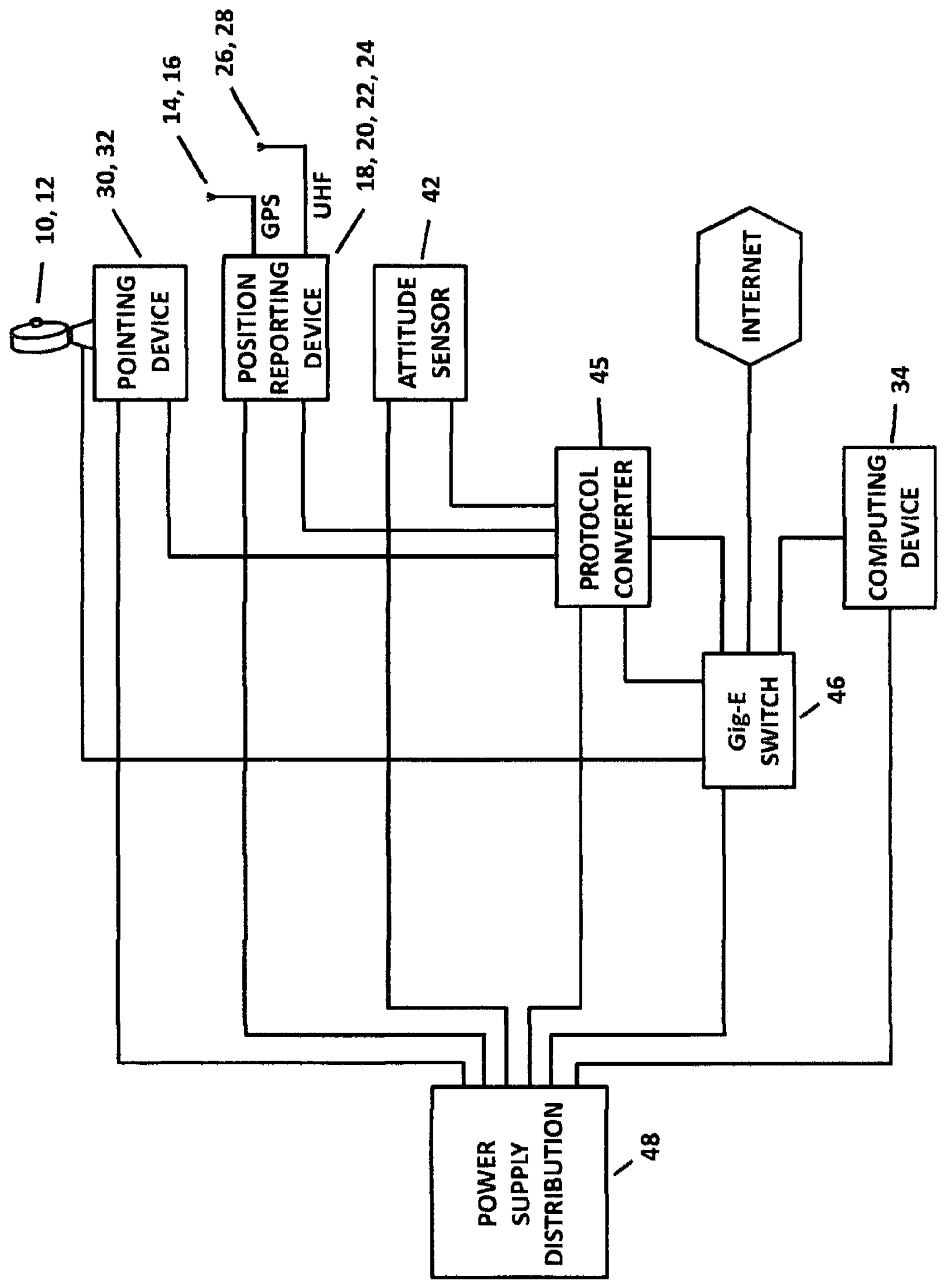
FIG. 2 is a block diagram of the system of the present invention.

It is emphasized that the position reporting radio receiver/transmitter may be integrated with the GPS circuitry, as will be further explained and as shown in FIG. 2. However, any embodiment where the position reporting radio and GPS unit are separate and discrete units, as shown in FIG. 1, is considered within the scope of the instant invention.

Pan and tilt systems 30, 32, respectively, attached to each antenna 10, 12 are controlled by computers or CPUs 34, 36, and which may be portable laptop computers that are programmed with Applicants software to aim or point each antenna 10, 12 in both azimuth and elevation responsive to location information received from the remote antenna and referenced by the local compass. The laptop or other computers are connected to the system via a base or mast component box 38, 40, respectively. In some instances a portable computer, such as a laptop computer, may be coupled to the antenna and associated components, such as when the antenna is mounted to a truck or other similar portable platform. In other instances, such as when the antenna is mounted at a permanent or semi-permanent location, the antennae may be aligned, and the computer removed. In this instance, the pan and tilt unit may be electrically locked in place, or fasteners used to manually lock it in place. In other instances, a dedicated computer may be left unattended at an antenna site. Also, since each antenna has its own IP address, an unattended computer may be operated remotely over the Internet using a Windows™ environment to align or realign an antenna.

The system of the instant invention is optimized for the Motorola™ PTP 600 series antenna systems, although any suitable data antenna and associated electronics package or packages may be used with the system of the instant invention with minor hardware modifications, and in some instances software changes that should be obvious to those skilled in the relevant arts.

FIG. 2 illustrates, in block diagram form, an overview of hardware of the system of the present invention. The data antennae and associated electronics 10, 12, which as noted may be one of the Motorola™ PTP 600 series antenna systems, is mounted to a pan and tilt unit, or pointing device 30, 32 having 360 degree pan and tilt capabilities, and which also has the capability to report the current pan and tilt position of the antenna and receive pan and tilt commands via an RS-232 output. One such pan and tilt unit that may be used in the instant invention is a Quickset™ pan and tilt unit model no. QTP-20, manufactured by Moog, Inc. The GPS portion of the position reporting radio/GPS unit provides 3.3 volts to an active antenna 14, 16. However, as noted, the GPS receiver, rather than being integrated with a UHF radio, may be any separate and discrete device commonly available today that provides GPS position via an RS-232 link. The antenna 26, 28 for the UHF portion of the position reporting radio/GPS units also may be any suitable type of UHF antenna matched to the frequency bands of the position reporting radio. More particularly, an antenna model number PCTEL, available from TRAM, Inc. works well with the position reporting radio. Like the GPS units, the position reporting radio portions 22, 24 also may be any radio intended for transmission over distances contemplated by the instant invention, i.e. any line of sight out to 60 miles or more. Particularly, a UHF radio/GPS unit model no. UV-M7-GX, made by Raveon Tech corp., located in La Mirada Vista, Calif., and which transmits and receives in the 450-512 frequency bands, has been found to be suitable for use in the instant invention. As noted, this radio also provides detected position by the GPS portion thereof and data received by the UHF radio via an RS-232 link.

The True Bearing and Elevation is compensated for by the Roll, Pitch, and Heading output from the Electronic Digital Compass. Mounting situations may occur such as where the antenna is mounted to a deployable mast, such as found on a weather monitoring truck that is frequently moved to different locations, a boat, ship, aircraft or the like. One compass that has been found to work well is an electronic digital compass model number SP304D, available from Sparton Electronics located in Brooksville, Fla. and which is a three-axis tilt-compensated digital compass that provides 3-dimensional absolute magnetic field measurements and 360 degree tilt compensated heading, pitch and roll data via an RS-232 connection.

Where the antenna and associated electronics are mounted at the top of a tall mast or tower and other electronics components are mounted or located at the base of the mast or tower, an RS-232 link between the top of the tower and the base of the tower is not feasible. Typically, an RS-232 link may not be used reliably where a cable distance is greater than about 50 feet or so because of signal loss and interference. Accordingly, the RS-232 signals from the pan and tilt device, the position reporting radio and compass are applied to a protocol converter 45, which is located at the top of the tower with the data antenna and other components, and converts the RS-232 signals to Ethernet signals for transmission to an Ethernet receiver 46 located at the bottom of the tower. While any suitable protocol converter may be used, an Ethernet converter model number 440, available from Chiyu, Inc., located in Chaiyi, Taiwan, has been found to work well in this application. This particular converter converts the RS-232 signals to bidirectional Ethernet 10/100/1000 TCP/IP signals, which enables them to be applied directly to the Internet where necessary. In the instant invention, the Ethernet communications from the devices at the top of the tower are received at the bottom of the tower over Ethernet cable by a 5 port, bidirectional 10/100/1000 Ethernet switch 46, such as a switch model number GS105, available from Linksys™. As such, any suitable laptop computer, or in some instantiations a desktop or other dedicated computer, may be plugged into one of the ports or installed in conjunction with the Ethernet switch in order to align and monitor alignment of the antenna. Such a computer or laptop computer typically has a Windows™ or Windows-emulating environment, a 750 MHz or better processor, at least 1 GB of ram memory, a 32 bit operating system or better and at least 250 MB available storage on a hard drive, flash drive or the like. In addition, such a computer is also capable of allowing a remote user to access the computer and control it from a remote location over the Internet, as is commonly done in Windows™, Unix™, Linux and other systems. Where the data antenna is transmitting Internet information, as shown in FIG. 2, the Internet information may also be conveyed from an Internet connection plugged into one of the data ports of switch 46 and carried to the data radio and antenna 10, 12 via a network or Ethernet cable.

AC and DC power is distributed to all components requiring such power by a power supply 48 located at the bottom of the mast or tower. Power for the data radio 10, 12 is provided by a power-over-Ethernet connection from a manufacturer's proprietary electronics package in an enclosure powered by 120 VAC at the bottom of the tower or mast to the data radio, while 120 VAC is converted by power supply and distribution unit 48 (FIG. 2) located at the bottom of the tower or mast to DC voltages used by other components of the system. Specifically, for components at the top of the mast, power supply 48 provides 24 volts DC to pan and tilt unit 30, 32, and to a power converter (not shown) that may be model no. V24C-12T100BG2, available from VICOR Inc, located in Andover Mass. The 12 volts DC therefrom is provided to position reporting radio/GPS unit 18, 20, 22, 24, compass 42 and protocol converter 45.

Arrangement and mounting of components of the instant invention is largely dependent on requirements of the customer, although some components necessarily need to be mounted near the data antenna. Specifically, the pan and tilt unit is necessarily mounted to the data antenna, and the GPS antenna needs to be mounted proximate the data antenna where it can acquire satellites in order to accurately locate the antenna's position.

Figure 3:
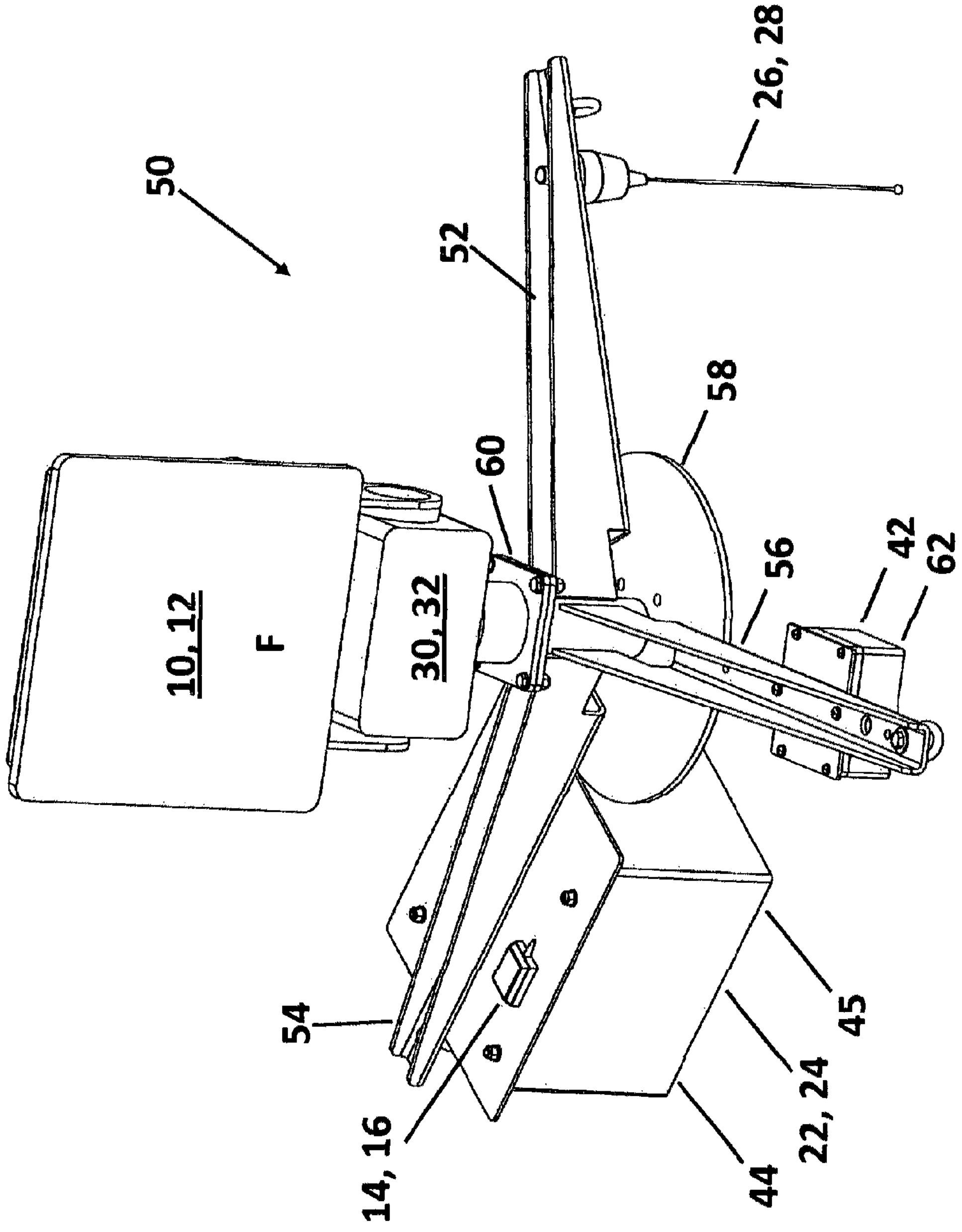
FIG. 3 is an illustration, by way of example only, of one mounting arrangement of the present invention.

For mounting a single data antenna to a mast, tower, or other structure, one convenient mounting arrangement provided by Applicant is shown in FIG. 3. Here, a mast assembly 50 is provided, and which is fabricated of materials such as aluminum, plastic, fiberglass and the like in order to avoid using ferrous materials, which would otherwise perturb the digital compass. For purposes of this application, electronic compass 42, antenna 26, 28, GPS antenna 14, 6 and associated receivers, pan and tilt unit 30, 32 and the components inside enclosure 45 are considered to be mounted "to the antenna" or to an "antenna assembly". As shown, there are three equipment arms 52, 54 and 56 that are each angularly spaced 120 degrees with respect to each other, and which converge at a mounting disk 58 where the mast assembly 32 may be securely mounted to a tower platform, mast or other convenient location. Above disk 58 is a mounting pad 60 to which the pan and tilt unit 30, 32 is mounted, with data antenna and associated radio 10, 12 mounted to the pan and tilt unit. Significantly, pad 60 is parallel to disk 58 so that the pan and tilt unit, and thus the antenna attached thereto, is in level relation with disk 58. Mounted to arm 52 is antenna 26, 28 for the position reporting radio, and mounted to arm 56 is digital compass and attitude sensor 42 (FIG. 2) housed in a non-ferrous enclosure 62. Antenna 14, 16 for the GPS position and altitude finding circuitry is mounted as shown on the top of a non-ferrous equipment enclosure 44 mounted to arm 54. Within enclosure 44 is mounted the combined position reporting radio and GPS circuitry 22, 24, protocol converter 45 and the 24 VDC to 12 VDC converter that provides electrical power to the position reporting radio/GPS unit 18, 20, 22, 24 and the compass and attitude sensor 42. Significantly, arm 56, to which compass 42 is mounted, may be used as a reference direction, or heading, for antenna 10, 12. As discussed herein, heading refers to a direction arm 56 is pointed, and bearing refers to a direction the axis of a beam envelope of the data antenna is pointed. Here, pan and tilt unit 30, 32 is provided with a home position with respect to rotation, or panning movement, of the pan and tilt unit. This home position may be any degree of rotation of panning movement, but typically is 0 degrees, 90 degrees, 180 degrees, or other convenient reference that is aligned with arm 56. In other words, if the reference direction of pan and tilt unit 30, 32 is selected to be 0 degrees along arm 56, then the reference direction of compass and attitude sensor 42 would also be 0 degrees along arm 56 when mounted to arm 56 as described. Likewise, tilt movement of pan and tilt unit 30, 32 has a home or level orientation referenced to mounting disk 58, mounting pad 60 or both. Thus, there is a reference position of the antenna along arm 56 in a panning direction, and a reference position in tilt, or attitude of the antenna. It is noted that arm 56 does not need to be pointed in any particular direction; the direction it happens to be pointed after base 50 is mounted is simply the heading used to calculate bearing of the antenna.

It is also noted that in some instances where the local antenna and remote antenna are not significantly separated in altitude, an altitude adjustment may not be needed. For instance, where the distance between the two antennae is relatively large, such as 50 miles or more, a difference in altitude of up to 2000 feet or so is insufficient to cause deterioration of signals received by each antenna where no correction for elevation occurs. However, where the distance between the local and remote antenna is a relatively short distance, such as 5 miles of so, an elevation of 2000 feet would need to be corrected for. As such, Applicant's software may incorporate instances where an operator may be presented a choice as to whether to correct for elevation between the two antennae, or ignore an elevation correction.

The compass and attitude sensor 42 is mounted as shown to arm 56 so that its attitude sensors are level with respect to the reference level position of pan and tilt unit 30, 32. With this construction, mount 50 may be mounted or placed in any orientation that will still allow the pan and tilt to move to a designated target, examples of such mounting arrangements being a truck parked on a hillside, an aircraft, a mast that does not extend straight up, or the like. The extent of such imperfect positions of the antenna are detected by the attitude sensors in compass 42, and digitally quantified to within about 1.0 degrees of tilt. Likewise, the initial bearing, or home position, of the antenna, is magnetically detected by compass 42 upon initialization. Using a lookup table or the like stored in the computer to determine magnetic declination at the location of the antenna, the number of degrees necessary to pan the antenna from its home position to a target position is determined. Where the antenna base is tilted on its mount, the tilt is sensed as described, and the tilt information used to tilt the antenna as it is panned, ensuring that the antenna does not point over or under the target when it is pointed at the target.

A base electronics enclosure 38, 40 (FIG. 1) is mounted on or proximate the bottom of mast or tower 13, 15 and in which is mounted a network interface 46, which as stated may be 5 port Ethernet 10/100/1000 switch (FIG. 2). One port of interface or switch 46 is coupled to protocol converter 45 in enclosure 44 via an Ethernet link to enable bidirectional Ethernet communications with the electronic components mounted as shown and described in FIG. 3. Also mounted in base electronics enclosure 38, 40 is a power supply and distribution unit 46 (FIG. 2), which is connected to conventional 120 VAC, and as noted provides 12 volts DC to switch 46. In the instance where a Motorola PTP 600 antenna is used, a PIDU power supply and antenna electronics package is also mounted in base enclosure 38. As noted, this proprietary electronics package provides power over Ethernet to the data antenna radio and also provides a passthrough for data to be transmitted from the data antenna, and for data received by the data antenna. Also shown connected to switch 46 is laptop or other computer 34, 36 that enables software in computer 34, 36 to communicate with pan and tilt unit 30, 32 (FIG. 2), position reporting radio 18-24 and compass and attitude sensor 42. Typically, after a GPS lock is obtained by the GPS receivers, alignment is usually accomplished within 2 minutes or so. This alignment may be done simultaneously by both antennae or one antenna at a time. Software for the instant invention is installed into computer or processor 34, which is installed and operated by a technician to perform automated alignment or boresighting sequences. As noted, in some instances the computer may be disconnected after alignment, and in other instances the computer may be left in place or a dedicated computer may be installed. Where a Windows™ environment or the like is installed on a dedicated computer, the computer may be remotely operated over the Internet using Windows™ and Applicants software to remotely align or realign an antenna.

Figure 4:
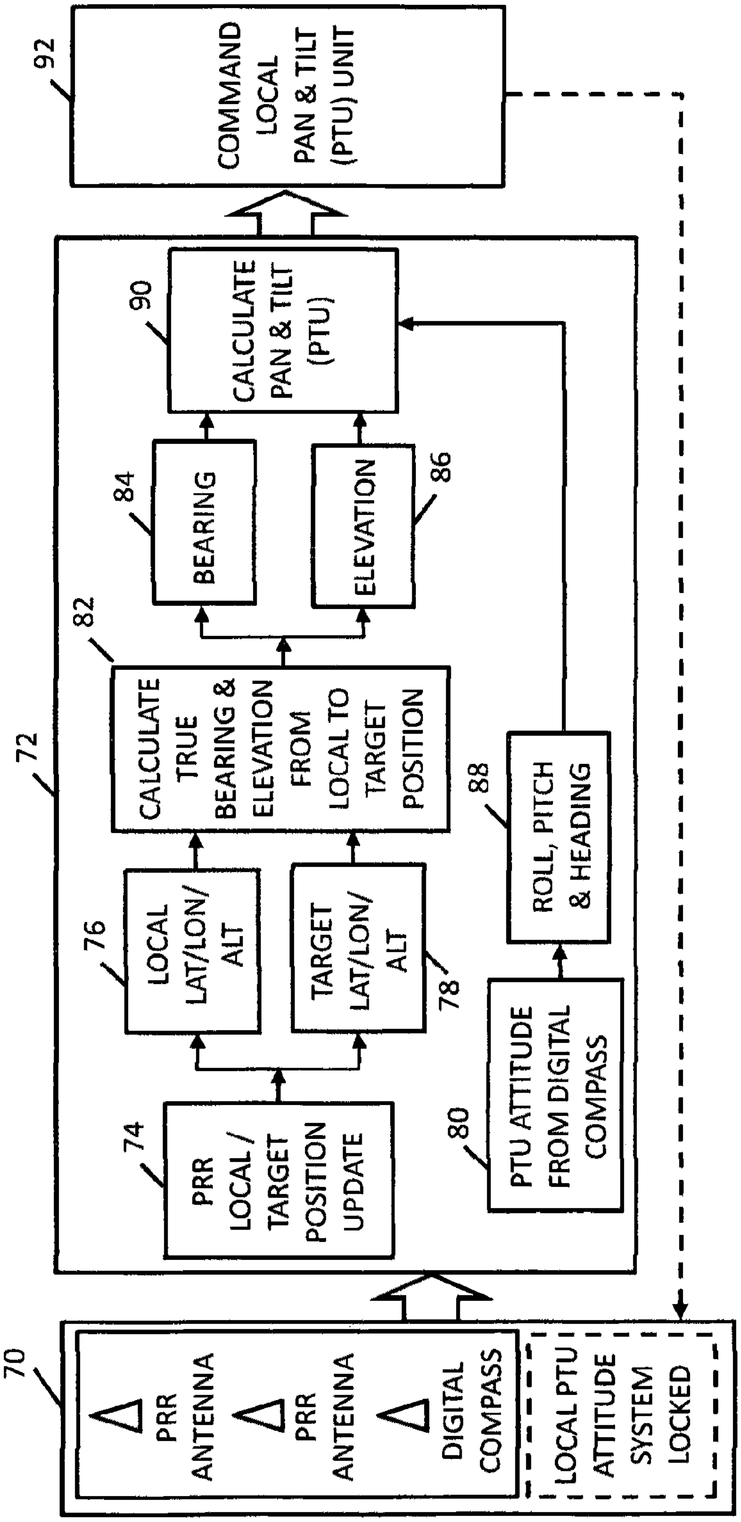
FIG. 4 is a top level flowchart of a method of the present invention.

Referring now to FIG. 4, a top level view of software of the instant invention is shown. After the target is selected using its location, IP address, station ID or the like, and at box 70, the local position from the local GPS receiver, labeled GPS antenna, is provided to computer 34, 36 along with location data, labeled PRR antenna, of the remote antenna from position reporting radio 18, 20. Data from digital compasses 42 at each data antenna 10, 12 indicating current orientation and heading of the local antenna is reported at box 80. As noted, the local position, remote position, heading and attitude information is provided at each data antenna to computer 34, 36 via the Ethernet link as described. This information is applied to box 82 where true bearing and elevation from the local position to the target position is calculated, and provided at boxes 84 and 86, respectively. At box 88 the roll and pitch information of the local antenna is applied to box 90 along with the bearing and elevation information to calculate pan and tilt commands for the local antenna, which are sent to the pan and tilt unit at box 92 in order to drive the local antenna to be boresighted to the remote antenna at box 92*a*.

Figure 5:
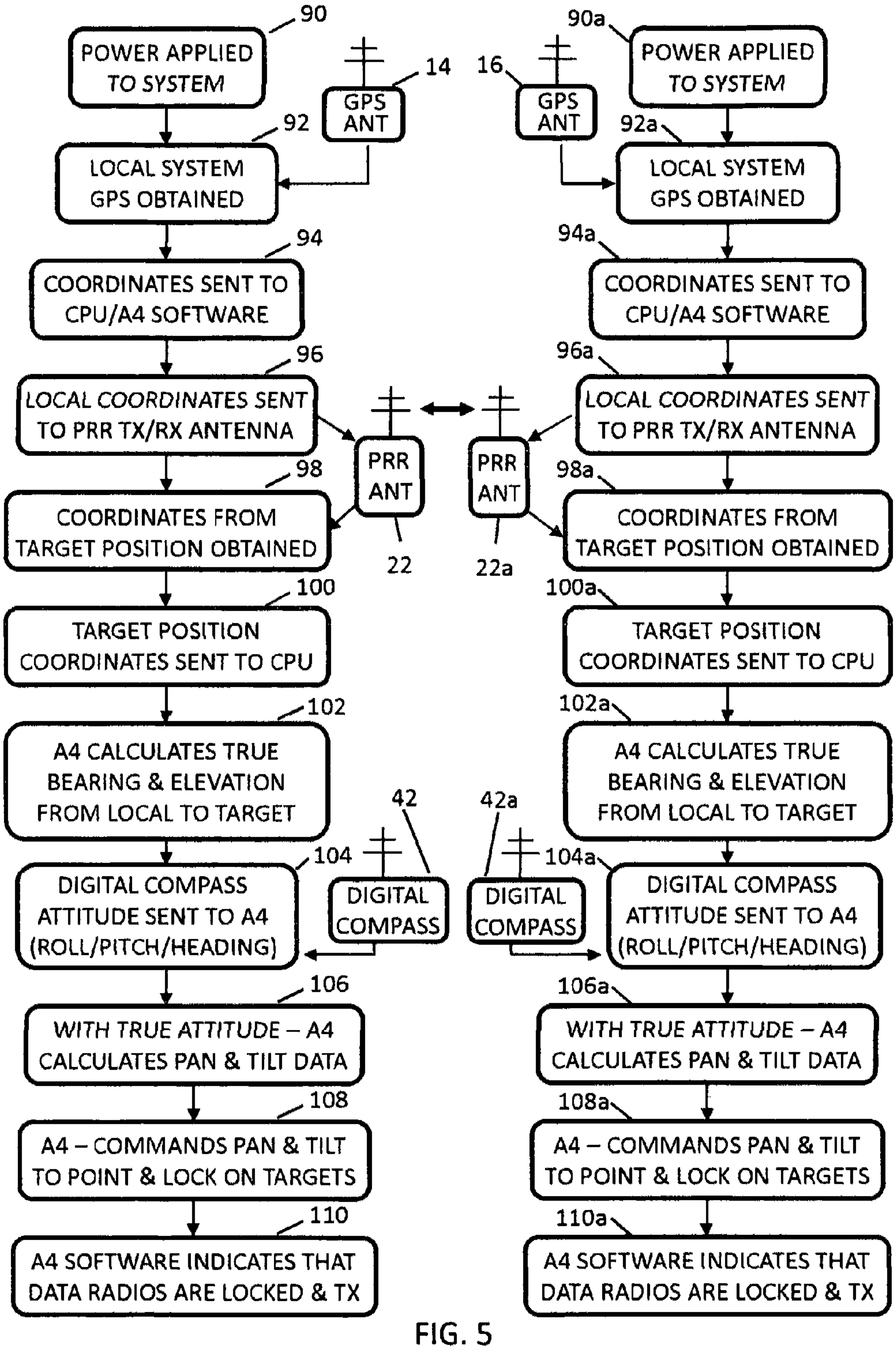
FIG. 5 is a detailed flowchart of the method of the present invention.

FIG. 5 illustrates the software algorithm for a local and remote antenna in more detail. At box 90, when electrical power is applied to the system, the system powers up and the computer bootstraps itself. A technician, or remote operator, initiates Applicants software to begin an alignment process. In the instance where the antenna was previously aligned with one or more other antennae, a list may be provided that includes location of such previously aligned antennae, their IP addresses, station IDs and possibly other identification. The local GPS receiver begins to acquire satellites, and when a sufficient number are acquired, latitude, longitude and altitude of the local data antenna is calculated at box 92. At box 94, the local position coordinates and altitude are provided to computer 26, and at box 96 the calculated local coordinates and altitude are sent to the remote antenna via position reporting radios 22, 24. At box 98 coordinates of the remote data antenna are obtained from local radio 22, 24. At box 100 the obtained target coordinates are sent to the local computer or processor 34, 36 (FIG. 1, 2) operated by the technician or remote operator. At box 102, the local computer 34, 36 uses the received target coordinates and the known local coordinates to calculate a true bearing that the local data antenna needs to be pointed toward in order to acquire the remote antenna. At box 104, information related to roll and pitch orientations of the local antenna from tilt sensors in each respective local compass 42, 42*a* are provided to local computer 34, 36, this information used in instances as described where the respective data antenna is tilted in some manner, for example, mounted to a movable or moving platform such as a truck, boat or ship, or in some instances an aircraft. In this instance, when the local antenna is panned, a correction factor is necessary to prevent the local antenna from being pointed above or below the remote antenna. The attitude information is used at box 106 to calculate the pan and tilt data, and at box 108 the data antenna is panned and tilted to the calculated bearing and elevation. If the signal from the remote antenna is found, then the new bearing and elevation are stored and the antenna is locked in place at box 110. The same steps are taken at boxes 90*a*-110*a* at the remote antenna.

Figure 6:
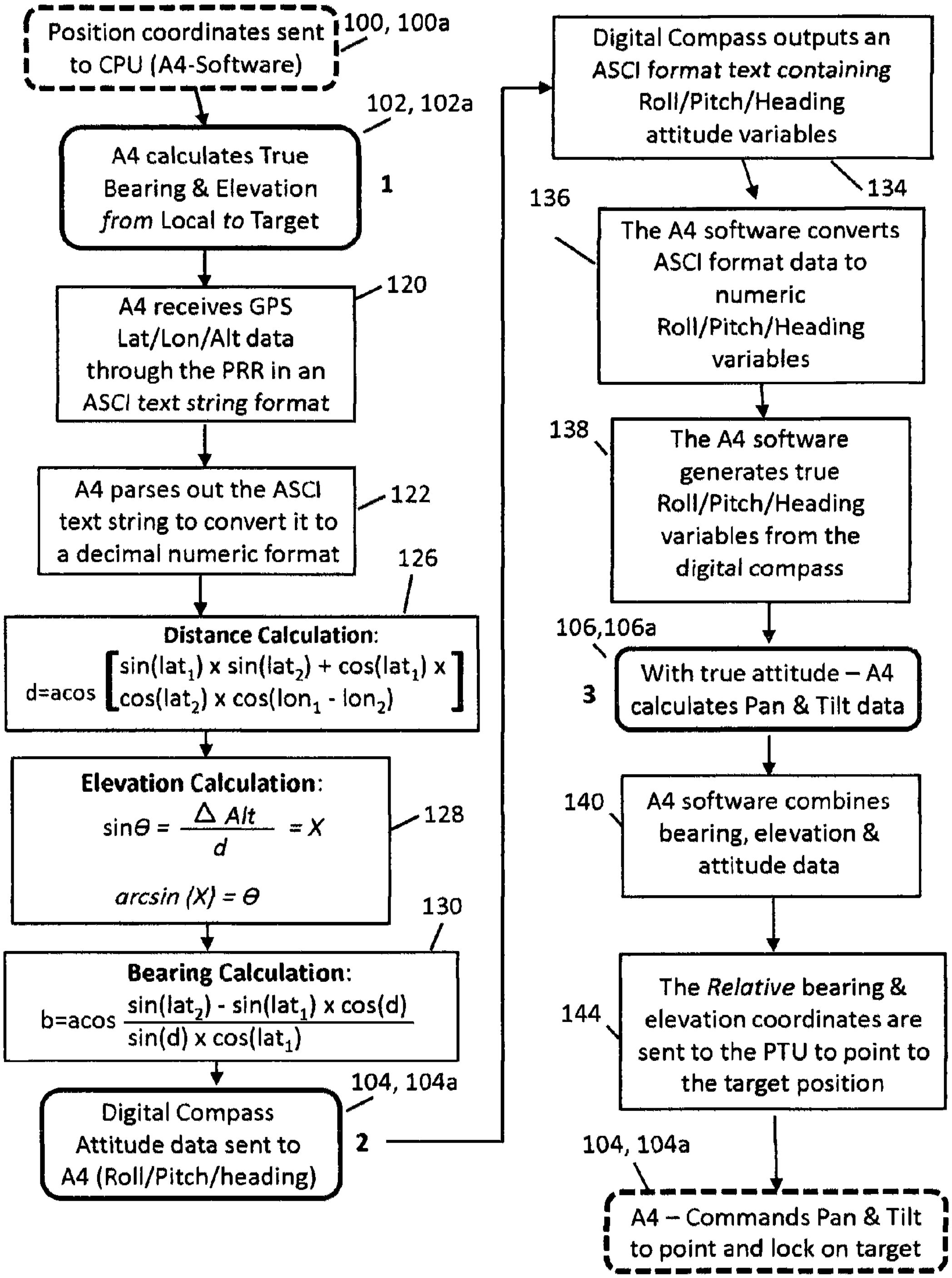
FIG. 6 is a detailed flowchart of a portion of the flowchart of FIG. 5.

Referring now to FIG. 6, detailed flowcharts of the processes of boxes 102, 104 and 106, and boxes 102*a*, 104*a* and 106*a* are shown. Here, after the target position coordinates received by the local UHF radio 18, 20 are sent to the local computer or processor, and as noted in FIG. 5 at boxes 102, 102*a*, the true bearing and elevation are calculated. In this process, and as shown at box 120, the respective local position reporting radio 22, 24 receives the transmitted latitude, longitude and altitude data from the remote antenna as a serial ASCII string. This ASCII string is converted at box 122 to a decimal numeric format. At box 126 a distance calculation is performed to determine a distance between the two antennae. Here, d is the calculated distance, $lat_1$ is the latitude of the local antenna, $lat_2$ is the latitude of the remote antenna, $lon_1$ is the longitude of the local antenna and $lon_2$ is the longitude of the remote antenna. The calculated distance value is stored, and at box 128 elevation between the local antenna and remote antenna is calculated. The elevation value is stored, and at box 130 bearing of the local antenna to the respective remote antenna is calculated, where b is the bearing, $lat_1$ is the local latitude, $lat_2$ is the remote latitude and d is the calculated distance. The calculated bearing is stored, and at box 134 roll and pitch values are obtained as an ASCII string, along with the magnetic heading (of arm 56). At box 136 the ASCII string is converted to numeric roll/pitch and heading variables. At box 138 roll, pitch and heading compensation variables are generated from the compass attitude data, i.e. the heading is compensated by the amount of magnetic declination, and at box 140 the attitude data and true bearing and elevation data are combined. At box 142 the magnetic bearing is compensated by the magnetic declination to produce a true bearing along which the antenna needs to be pointed in order to be directed at the remote antenna. At box 144 the number of degrees necessary to pan the antenna from its current position, or its home position, to the calculated true bearing is sent to the pan and tilt unit, along with the number of degrees of elevation calculated at box 128.

In rare instances when the local and remote antennae do not arrive at a sufficient alignment, a fine tuning process may be undertaken. Here, an option to fine tune is presented on a computer screen to the technician at the local antenna that when selected, initiates the fine alignment process. In this process, the current antenna pan and tilt position is taken to be the center of a selectively sized matrix of antenna aiming points, such as a 3×3 matrix, a 5×5 matrix, or 7×7 matrix. The matrix may be any convenient shape, such as the shape of a cross section of the beam envelope, or round or square. A distance between each aiming point of the matrix is selectable in degrees of pan and tilt. For instance, and by way of example, a matrix of 5×5, or 25 aiming points each separated by 1 degree of pan and tilt movement to cover 5 degrees of pan and 5 degrees of tilt motion of the antenna, may be used. A routine programmed into the computer selects a first aiming point, which may be the upper left aiming point of the matrix, and the pan and tilt unit is provided commands to drive the antenna mounted thereto to this first aiming point. The signal strength from the remote antenna is recorded, and the antenna is driven to the next aiming point and the process repeated. Thus, the antenna is stepped through all the aiming points, following either rows or columns or any other desired pattern, such as a circular pattern, until the signal strength at each aiming point in the matrix is recorded. The computer then simply selects the aiming point having the strongest signal strength as the aiming point that the antenna is driven to. Alternately, once an aiming point having a sufficiently strong signal strength is found, the process may be terminated without going to completion, and the sufficiently strong aiming point used as the aim point of the antenna.

Following is one example of operation of the system of the instant invention. A vehicle has a mission to transmit video/data to a tower ~40 miles from the vehicle. Once the vehicle is parked, the antenna mast having a data antenna and associated components as described above is deployed. Where necessary, a portable computer having Applicant's software installed thereon is connected to a base box 38 (FIG. 1), as by a USB connection. Power is then applied to the system and to the computer. The user starts the A-4 program (Applicant's software), as by clicking on an icon that directs the program to start. An opening menu may be presented that allows a user to set or select operational parameters, such as range and an IP address or other identification of the remote antenna, and a start button is activated. Using Applicant's A-4 software as the method of aligning the data antenna on the truck with the data antenna on the tower, and vice versa, the process each system goes through to achieve automatic alignment is outlined as follows. Once powered up, the local GPS position is obtained. If the remote antenna is also powered up at this time, the remote location is obtained via the Position Reporting Radio (PRR) of the local antenna. This may be a simultaneous process at the local data antenna and the remote data antenna. Once each system has its own GPS coordinates, the respective PRR radio transmits this location information to the respective PRR radio at the remote location. Applicant's software calculates the proper pointing angle using the GPS coordinates and the local attitude information (from the compass) through a series of calculations. The two system's data coordinates are shown below.

Position #1 (Vehicle)
LAT 34.73730 ($lat_1$)
LON −86.53270 ($lon_1$)
ALT 489
TARGET TRUE DISTANCE 41.032 MILES (d)
BEARING 257.405 DEGREES
ELEVATION −0.204 DEGREE (position 1-8)
HEADING 045 DEGREES
ROLL 0.3 DEGREE
PITCH 0.6 DEGREE
COMMANDED PAN/TILT
PAN −147.597 DEGREES
TILT 0.1419 DEGREE
Position #2 (Tower)
LAT 34.60560 ($lat_2$)
LON −87.23780 ($lon_2$)
ALT 254
TARGET TRUE DISTANCE 41.032 (d)
BEARING 77.042
ELEVATION 0.204 (position 2-θ)
HEADING 270
ROLL −0.8
PITCH −0.5
COMMANDED PAN/TILT
PAN 167.002 DEGREES
TILT −0.463 DEGREE Input the data above to find true bearing and elevation using the formula below:

Distance Calculation:
d=distance between two points
$lat_1$=34.73730
$lat_2$=34.60560
$lon_1$=−86.53270
$lat_2$=−87.23780

$$d = a\cos\begin{bmatrix}\sin(lat_1)\times\sin(lat_2)+\cos(lat_1)\times\\ \cos(lat_2)\times\cos(lon_1-lon_2)\end{bmatrix}$$

Elevation Calculation:
d=41.032
Alt (pos 1)=489 meters
Alt (pos 2)=254 meters

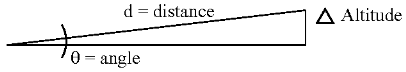

$$\sin\theta = \frac{\Delta Alt}{d} = X \quad \arcsin(X) = \theta$$

HEADING Calculation:
B=heading from the point of origin
$lat_1$=34.73730
$lat_2$=34.60560

$$d = a\cos\frac{\sin(lat_2)-\sin(lat_1)+\cos(d)}{\sin(d)\times\cos(lat_1)}$$

The True Bearing and Elevation (obtained from above calculation) combined with the attitude (Heading, Roll, and Pitch obtained from the digital compass) are used by the A4 software to calculate Relative Bearing and Relative Elevation that are translated into pan and tilt command that are sent to the pan and tilt unit to point to the respective target unit.

Having thus described the invention and the manner of its use, it should be apparent to those skilled in the relevant arts that incidental changes may be made thereto that fairly fall within the scope of the following appended claims, wherein I claim:

1. A method using a computer for automatically aligning a local data antenna with a remote data antenna comprising:

associating a local reference heading establisher with said local data antenna, for determining a local reference heading for said local data antenna, providing determined local reference heading signals to said computer, providing a local location finder at said local data antenna, for determining local location information of said local data antenna, providing determined local location information signals to said computer, providing a remote location finder at said remote data antenna, for determining remote location information of said remote data antenna, providing said remote location information signals to said computer, using said computer, calculating a difference between said local reference heading and a bearing from said local data antenna to said remote data antenna, using a calculated said difference between said local reference heading and said bearing to said remote data antenna to drive said local data antenna to point along said bearing to said remote data antenna.

2. A method as set forth in claim 1 wherein said local location information signals and said remote location information signals further comprise altitude information of a respective said data antenna, said method further comprising:

calculating a difference in altitude between said local data antenna and said remote data antenna, using a calculated said difference in altitude, tilting said local data antenna to point in altitude at said remote data antenna.

3. A method as set forth in claim 1 wherein said reference heading establisher further comprises providing an electronic magnetic compass at said local data antenna for providing said local reference heading signals to said computer.

4. A method as set forth in claim 3 further comprising programming said computer for electronically correcting said local reference heading by magnetic declination, said computer providing a corrected true local reference heading.

5. A method as set forth in claim 1 further comprising mounting a tilt sensor to said local data antenna and providing tilt signals indicative of extent of tilt of said local data antenna to said computer, and compensating for said extent of tilt during panning movements of said local data antenna.

6. A method as set forth in claim 1 wherein said calculating a difference between said local reference heading and said bearing by said computer further comprises:

determining a magnetic declination at said local data antenna, using a determined said magnetic declination to calculate a true bearing to said remote data antenna.

7. A method as set forth in claim 1 wherein said providing a local reference heading of said local data antenna further comprises arbitrarily selecting any reference heading to serve as said local reference heading of said local data antenna.

8. A method as set forth in claim 1 further comprising:

providing said remote data antenna with a remote computer, associating a remote reference heading establisher with said remote antenna, for determining a remote reference heading for said remote antenna, providing determined remote reference heading signals to said remote computer, providing said remote information signals and said local information signals to said remote computer, using said remote computer, calculating a difference between said remote reference heading and a bearing from said remote data antenna to said local data antenna, using a calculated said difference between said remote reference heading and said bearing to said local data antenna to drive said remote data antenna to point along said bearing to said local data antenna.

9. A method as set forth in claim 8 further comprising simultaneously aligning said local data antenna and said remote data antenna.

10. A method as set forth in claim 8 further comprising using a separate local transmitter and receiver at said local data antenna, for transmitting said local location information and receiving transmitted said remote location information, and using a separate remote transmitter and receiver at said remote data antenna to transmit said remote location information and receive said local location information without using said local data antenna and said remote data antenna to exchange respective location information.

11. A method as set forth in claim 1 further comprising using a GPS receiver for said local location finder and a GPS receiver for said remote location finder.

12. A computerized method for automatically aligning two data antennae comprising:

using a reference heading establisher associated with at least one data antenna of said two data antennae to establish a reference heading for said at least one data antenna, providing reference heading signals representative of an established said reference heading of said at least one data antenna to a computer associated with said at least one data antenna, using a location finder associated with said at least one data antenna to determine location of said at least one data antenna, and develop first location signals indicative of location of said at least one data antenna, providing said first location signals to said computer associated with said at least one data antenna, using a location finder associated with the other data antenna of said data antennae to determine location of said other data antenna, and develop second location signals indicative of location of said other data antenna, providing said second location signals to said computer associated with said at least one data antenna, using said computer associated with said at least one data antenna, calculating a difference between said reference heading for said at least one data antenna and a bearing from said at least one data antenna to the other data antenna, using a calculated said difference, driving said at least one data antenna to point at said other data antenna.

13. A method as set forth in claim 12 wherein said establishing said reference heading for said at least one data antenna further comprises arbitrarily selecting a heading from said at least one data antenna to use as said reference heading.

14. A method as set forth in claim 13 wherein said arbitrarily selecting a heading further comprises:

designating an elongated portion of support structure for said at least one data antenna to determine said reference heading from said at least one data antenna, establishing said reference heading as a direction along a long axis of said elongated portion of support structure.

15. A method as set forth in claim 14 further comprising mounting said at least one data antenna on support structure therefor so that a home or 0 degree orientation of said at least one data antenna, with respect to panning movements, is pointed lengthwise along said elongated portion of said support structure.

16. A method as set forth in claim 13 further comprising:

determining a tilt parameter of said at least one data antenna and developing signals representative of said tilt parameter, providing said signals representative of said tilt parameter to said computer associated with said at least one data antenna, compensating for tilt of said at least one data antenna during panning motions of said at least one antenna.

17. A method as set forth in claim 12 further comprising obtaining said second location signals without using a data antenna of said at least one data antenna.

18. A method as set forth in claim 17 further comprising transmitting said second location signals from said other data antenna using a UHF transmitter, and receiving said second location signals at said at least one data antenna using a UHF receiver.

19. A method as set forth in claim 16 further comprising:

using a reference heading establisher associated with said other data antenna to establish a reference heading for said other data antenna, providing reference heading signals representative of an established said reference heading of said other data antenna to a computer associated with said other data antenna, providing said second location signals to said computer associated with said other data antenna, using said computer associated with said other data antenna, calculating a difference between said reference heading for said other data antenna and a bearing from said other data antenna to said at least one data antenna, using a calculated said difference, driving said other data antenna to point at said at least one data antenna.

20. A method as set forth in claim 19 further comprising transmitting said first location signals from said at least one data antenna to said other data antenna using a UHF radio, and receiving said first location signals at said other data transmitter using a UHF receiver.

* * * * *